United States Patent [19]

Seachman, Ned J.

[11] 4,009,388
[45] Feb. 22, 1977

[54] ARRANGEMENT FOR EXTENDING PHOTOSENSOR ARRAY RESOLUTION

[75] Inventor: Ned J. Seachman, Penfield, N.Y.
[73] Assignee: Xerox Corporation, Stamford, Conn.
[22] Filed: Oct. 30, 1975
[21] Appl. No.: 627,499
[52] U.S. Cl. .............................. 250/208; 250/578
[51] Int. Cl.² ....................................... H01J 39/12
[58] Field of Search .......... 250/208, 209, 578, 216, 250/201

[56] References Cited
UNITED STATES PATENTS

| 3,285,124 | 11/1966 | Lovins | 356/110 |
| 3,555,285 | 1/1971 | Irving | 250/578 X |
| 3,875,401 | 4/1975 | Stauffer | 250/201 |
| 3,911,410 | 10/1975 | Ohta et al. | 250/578 X |

Primary Examiner—David C. Nelms
Attorney, Agent, or Firm—Robert J. Bird

[57] ABSTRACT

An optical arrangement for splitting an optical path into twin paths so that an image propagating along the path from an object plane is incident upon one or the other of two linear arrays of photosensor elements disposed at twin image planes. The arrangement provides a way to optically compact the photosensors in a continuous image line to improve the resolution of the image as detected by the photosensors.

3 Claims, 5 Drawing Figures

ARRAY 2a ELEMENTS:
 SOLID BOUNDARIES
 X-CENTERS

ARRAY 2b ELEMENTS:
 DASHED BOUNDARIES
 O-CENTERS

ARRAY 2a ELEMENTS:
SOLID BOUNDARIES
X-CENTERS

ARRAY 2b ELEMENTS:
DASHED BOUNDARIES
O-CENTERS

ARRANGEMENT FOR EXTENDING PHOTOSENSOR ARRAY RESOLUTION

BACKGROUND OF THE INVENTION

This invention relates to linear image sensors in which light propagating from an object and incident imagewise on photosensor arrays signals an imagewise electrical output.

Large arrays of solid-state photosensors are currently used in applications such as video cameras and document scanners. The semiconductor fabrication techniques currently employed to manufacture these arrays limit the maximum physical dimension to approximately one inch. There are further limitations, both physical and electrical, which establish a minimum center-to-center distance between adjacent photosensor elements. Thus, in a single array, there exists a maximum number of photosensor elements which can be practically fabricated. Since the image resolution achievable with such an array is proportional to the number of photosensor elements in the array, there are potential scanning applications where the available number of photosensors in one array is insufficient to produce the desired image resolution. To overcome this difficulty, it is common practice to use several photosensor arrays such that the total number of photosensor elements is adequate to achieve the desired image resolution.

It is an object of this invention to provide a novel optical-mechanical technique for combining a plurality of photosensor arrays for improvement in resolution of the image sensed and signaled thereby.

SUMMARY OF THE INVENTION

This invention is practiced in one form by an optical arrangement for splitting an optical path into twin paths so that an image propagating along the path from an object plane is incident upon one or the other of two linear arrays of photosensor elements disposed at twin image planes. The arrangement provides a way to optically pack the photosensors in a continouous image line to improve the resolution of the image incident upon the photosensors.

For a better understanding of this invention, reference is made to the following more detailed description of an exemplary embodiment, given in connection with the accompanying drawing.

DRAWING

DESCRIPTION

Figure 1:
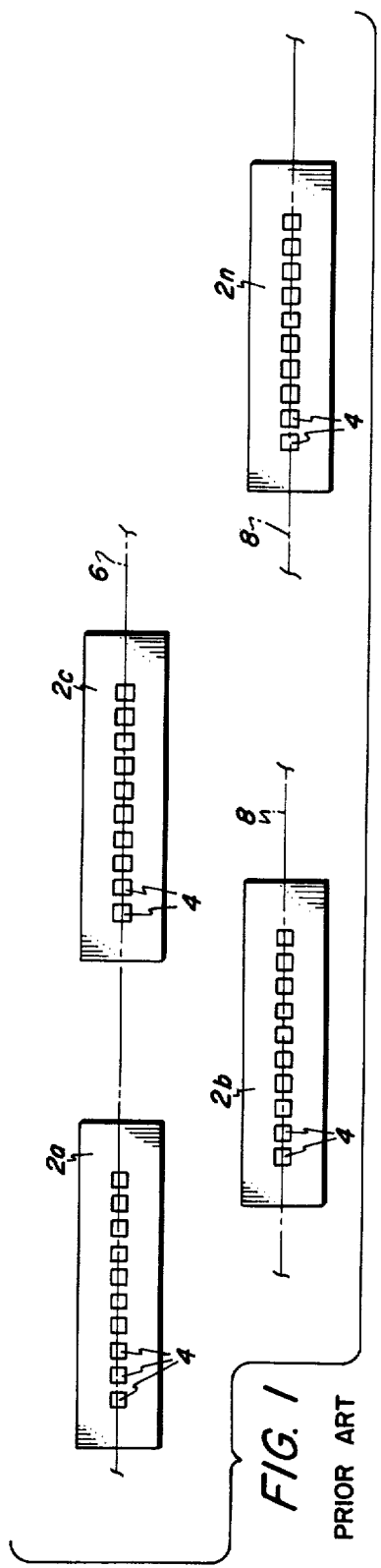
FIG. 1 is a schematic diagram of a plurality of staggered arrays of photosensor elements, as practiced in the prior art.

To illustrate the advantages of the present invention, the prior art will first be described. In one commercially used method, as represented in FIG. 1, several arrays 2a, 2b, 2c . . . 2n of photosensor elements are arranged side-by-side in a staggered fashion. Each array 2 is composed of a plurality of individual photosensor elements 4 disposed relative to each other at a certain center-to-center distance along a line. The first array 2a is offset from the second array 2b which in turn is offset from the third array 2c and so on alternately to the last array 2n. Alternate arrays 2a, 2c, . . . are arranged in one line 6 and alternate arrays 2b . . . 2n are arranged along a second line 8. The staggering of these alternate arrays is necessary since the last photosensor element 4 of one array cannot be brought into sufficiently close proximity to the first photosensor element 4 of the next array because of physical or mechanical limitations. A separate lens, or lens/beam splitter combination, not shown, is used to image an appropriate portion of the object at each array. This prior art system requires a difficult and expensive alignment of lenses and photosensor arrays.

Figure 2:
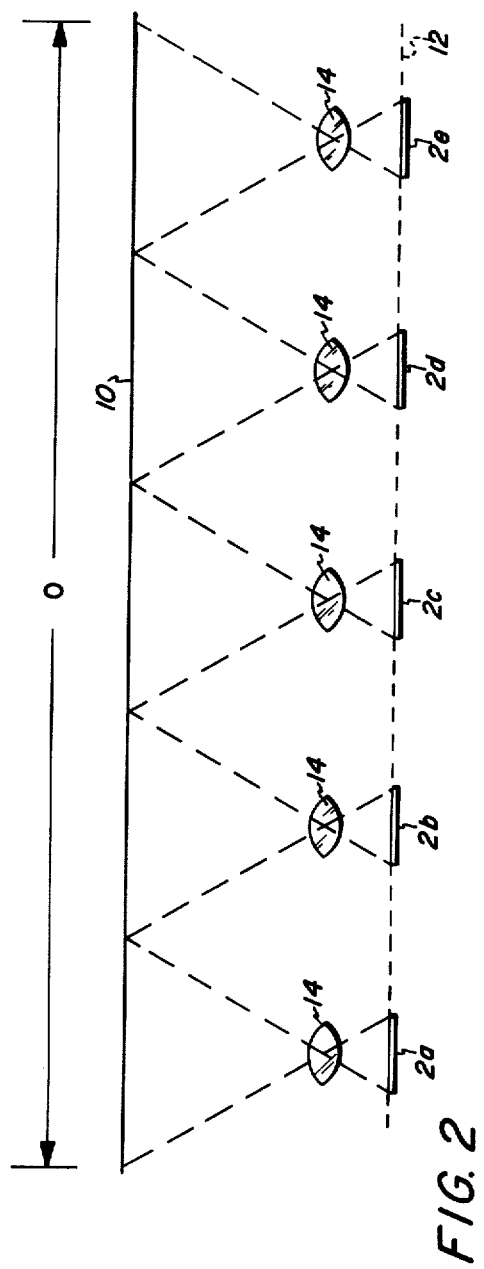
FIG. 2 is a schematic representation of another arrangement used in the prior art to image an original object onto a plurality of arrays of photosensor elements.

Referring to FIG. 2, another prior art multiple lens arrangement is represented, without staggering of the photosensor arrays. In this case, projection lenses 14 are used at a magnification of less than unity between an object 0 at object plane 10 and photosensor array 2 at image plane 12. Due to the image reduction, adjacent arrays 2a, 2b, etc. are not required to be packed, optically or otherwise, in a continuous line. This arrangement requires precise alignment of each of the several lenses.

Figure 3:
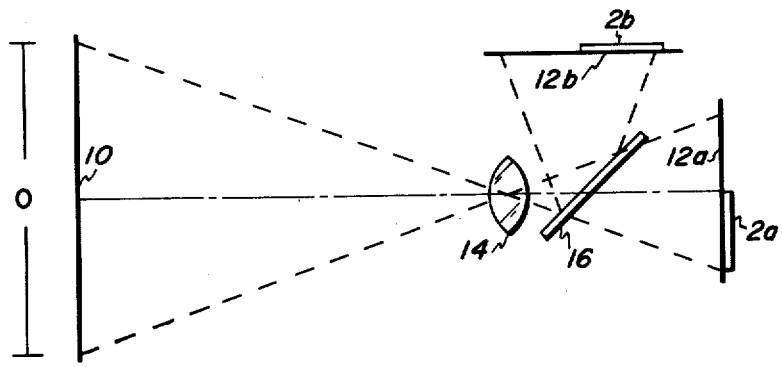
FIG. 3 is a schematic representation of yet another prior art approach to imaging an original object onto a plurality of arrays of photosensor elements.

Referring to FIG. 3, another arrangement is shown which includes a beam splitter 16 in the optical path between object plane 10 and image plane 12 to produce twin images of the object plane with one lens 14. In this prior art, the second array 2b in image plane 12b is placed such that its first element is optically adjacent to the last element of the first array 2a in image plane 12a, i.e. arrays 2a and 2b are optically placed end-to-end. Thus, the arrays 2a and 2b are optically disposed along the same line of image information without physical interference. In this arrangement, however, at least 50% of the light from the object is lost at the image plane.

Figure 4:
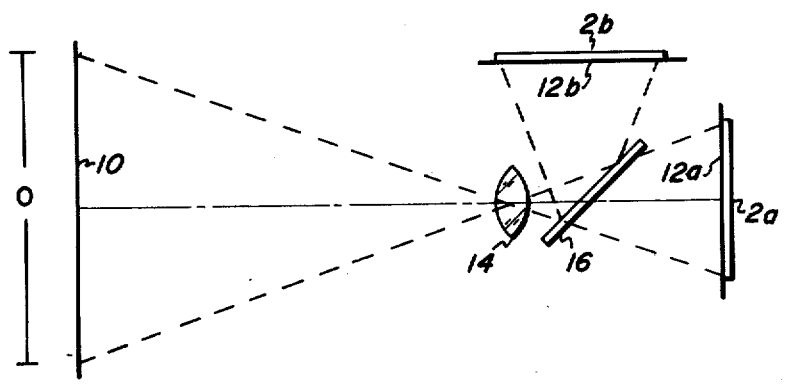
FIG. 4 is a schematic diagram similar to FIG. 3 of an arrangement according to the present invention.

Referring now to FIG. 4, the present invention which eliminates or reduces the difficulties described in connection with FIGS. 1 – 3 is represented. As in FIG. 3, the object 0 is located at object plane 10 and is imaged by a projection lens 14 at image plane 12. A beam splitter 16 divides the image propagating light so that image plane 12 is optically split into twin image planes 12a and 12b. In this arrangement, unlike FIG. 3, photosensor arrays 2a and 2b extend along substantially the same line of image information, except that photosensor array 2b is shifted along this line, relative to array 2a, by one half the center-to-center spacing $d$ of the individual photosensor elements 4. Thus, the centers of the photosensor elements of array 2a effectively lie on the same line of image information as the centers of the photosensor elements of array 2b, but are slightly displaced so as to be located midway between the centers of the elements of array 2b.

Figure 5:
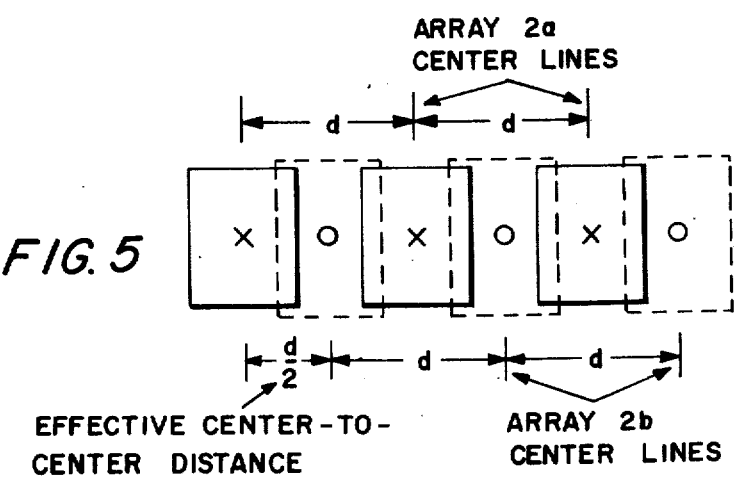
FIG. 5 is a schematic representation of a plurality of arrays of photosensor elements optically superposed at an image plane.

FIG. 5 illustrates the effective optical superposition of photosensor arrays 2a and 2b and their individual photosensing elements 4. The elements of array 2a are represented here in solid lines and their centers indicated by $x$, and the elements of array $2b$ are represented in dashed lines and their centers indicated by $o$. The resultant effective center-to-center spacing of photosensor elements 4 is $d/2$, with a permissible individual aperture width $w$ ranging from $0<w<d$.

There are several advantages to the arrangement described. First, it offers the alignment simplicity of the beam splitter technique while at the same time using substantially 100% of the light from the object. Secondly, effective resolution is easily shown by the sampling theorem to increase from $1/2d$ cycles per unit length for one array to $1/d$ cycles per unit length for the two combined arrays. Furthermore, the maximum readout rate is doubled with respect to the maximum for any one array.

Additional modifications to aperture geometry are possible with this arrangement which can substantially improve performance over existing techniques. It is recognized from sampling theorem considerations that the optimum width of each sensor element should be larger than the effective center-to-center spacing of these elements. With the superposed aperture arrangement described above, the effective center-to-center spacing is $d/2$ while the maximum single aperture width is $d$. With a non-superposed arrangement, of course, the aperture width cannot exceed the center-to-center spacing, or in other words, center-to-center spacing is always as large or larger than the aperture.

The optical superposition feature of this invention has been described with the system in a static condition, that is, without reference to any scanning movement in the system. A useful scanning system employing this feature might take any of several forms. Examples of these are: (a) stationary object and optics with scanning photosensor elements; (b) moving object with stationary optics and photosensor elements; (c) stationary object with rotating mirrors in the optical path and stationary optics and photosensor elements; (d) stationary object, optics and photosensor elements with rotating prism beam splitter in the optical path.

The foregoing description of this invention is given by way of illustration and not of limitation. The concept and scope of the invention are limited only by the following claims and equivalents thereof which may occur to others skilled in the art.

What is claimed is:

1. An optical system for projecting twin images of an object from an object plane to an image plane and for sensing said image at said image plane, including:
   a projection lens disposed on an optical axis between said object plane and said image plane to project an image of an object from said object plane to said image plane,
   a beam splitter disposed on said optical axis between said projection lens and said image plane to partially transmit said image toward a first image plane and to partially reflect said image toward a second image plane, said first and second image planes thus being twin image planes in optical superposition,
   a first linear array of photosensor elements disposed in said first image plane, said elements being separated by a center-to-center spacing $d$,
   a second linear array of photosensor elements disposed in said second image plane, said elements being separated by a center-to-center spacing $d$,
   said first and second arrays of photosensor elements being disposed in conjugate relationship to the same object line and being linearly offset relative to each other with respect to said object line by an amount $d/2$ so as to optically double the spatial density of said photosensor elements for increased resolution of image sensing by said elements.

2. An image sensing system optically disposed relative to a conjugate object plane as follows:
   a plurality of discrete photosensor elements arranged in a first linear array and separated by a center-to-center spacing $d$,
   a plurality of discrete photosensor elements arranged in a second linear array and separated by a center-to-center spacing $d$,
   said first and second arrays of photosensor elements being respectively disposed in first and second image planes in conjugate relationship to the same object line of said object plane and being linearly offset relative to each other with respect to said object line by an amount $d/2$ so as to optically compact said photosensor elements relative to said object line.

3. An image sensing system optically disposed relative to a conjugate object plane as follows:
   a plurality of discrete photosensor elements arranged in a first linear array and separated by a center-to-center spacing $d$,
   a plurality of discrete photosensor elements arranged in a second linear array and separated by a center-to-center spacing $d$,
   said first and second arrays of photosensor elements being respectively disposed in first and second image planes in optical communication with said conjugate object plane by means of a beam divider disposed in the optical path between said object plane and said image planes,
   said first and second arrays of photosensor elements being in conjugate relationship to the same object line of said object plane, and being linearly offset relative to each other with respect to said object line by an amount $d/2$ so as to optically compact said photosensor elements relative to said object line.

* * * * *